US012789439B2

(12) United States Patent
Gleixner

(10) Patent No.: US 12,789,439 B2
(45) Date of Patent: Nov. 10, 2026

(54) DISPENSER CONTAINER AND METHOD FOR PRODUCING A DISPENSER CONTAINER

(71) Applicant: INOTECH Kunststofftechnik GmbH, Nabburg (DE)

(72) Inventor: Josef Gleixner, Nabburg (DE)

(73) Assignee: INOTECH Kunststofftechnik GmbH, Nabburg (DE)

( * ) Notice: Subject to any disclaimer, the term of this patent is extended or adjusted under 35 U.S.C. 154(b) by 78 days.

(21) Appl. No.: 18/866,913

(22) PCT Filed: Apr. 21, 2023

(86) PCT No.: PCT/EP2023/060472
§ 371 (c)(1),
(2) Date: Nov. 18, 2024

(87) PCT Pub. No.: WO2023/232346
PCT Pub. Date: Dec. 7, 2023

(65) Prior Publication Data

US 2025/0340007 A1 Nov. 6, 2025

(30) Foreign Application Priority Data

Jun. 1, 2022 (DE) ......................... 102022113840.2

(51) Int. Cl.
*B29C 49/02* (2006.01)
*B29C 49/00* (2006.01)
(Continued)

(52) U.S. Cl.
CPC .......... *B29C 49/0208* (2022.05); *B29C 49/06* (2013.01); *B29C 49/071* (2022.05);
(Continued)

(58) Field of Classification Search
CPC ... B29C 49/0208; B29C 49/06; B29C 49/071; B29C 49/12; B29C 49/251; B29C 49/24;
(Continued)

(56) References Cited

U.S. PATENT DOCUMENTS

| | | | |
|---|---|---|---|
| 8,167,171 | B2 | 5/2012 | Moretti |
| 2007/0267437 | A1 | 11/2007 | Nimmo et al. |

(Continued)

FOREIGN PATENT DOCUMENTS

| | | | |
|---|---|---|---|
| DE | 4027539 | A1 | 3/1992 |
| DE | 102014113535 | A1 | 3/2016 |

(Continued)

*Primary Examiner* — Galen H Hauth
*Assistant Examiner* — Baileigh Kate Darnell
(74) *Attorney, Agent, or Firm* — AVEK IP, LLC; Kent R. Erickson

(57) ABSTRACT

Manufacturing techniques are provided for dispenser containers. An external container is formed from a dimensionally stable material. A preform is provided that has a cup-like molded body constructed from at least two portions. A first portion is made of a blow moldable elastic plastic that is intended for the formation of an internal-container body. A second portion is made of a dimensionally stable plastic for the formation of an internal-container dispensing portion. The second portion has on its outer surface a slot-like recess to provide a vent duct. The preform is heated thereby introducing the preform into the external container and introducing a stretch blow molding pin into the preform. The blow molding is stretched in order to form an internal container with expulsion of the air contained in the space located between the preform and the external container such that the air escapes into the environment via the vent duct.

20 Claims, 3 Drawing Sheets

(51) Int. Cl.

| | |
|---|---|
| ***B29C 49/06*** | (2006.01) |
| ***B29C 49/12*** | (2006.01) |
| ***B29C 49/24*** | (2006.01) |
| *B29K 675/00* | (2006.01) |
| *B29L 31/00* | (2006.01) |

(52) U.S. Cl.

CPC ............ *B29C 49/12* (2013.01); *B29C 49/251* (2022.05); *B29C 2049/2404* (2013.01); *B29C 2949/0715* (2022.05); *B29C 2949/3004* (2022.05); *B29K 2023/06* (2013.01); *B29K 2675/00* (2013.01); *B29L 2031/7158* (2013.01)

(58) Field of Classification Search

CPC ................ B29C 49/0042; B29C 49/02; B29C 2049/2404; B29C 2949/0715; B29C 2949/3004; B29C 2949/0741; B29C 2949/0744; B29K 2075/00; B29L 2031/7158

See application file for complete search history.

(56) References Cited

U.S. PATENT DOCUMENTS

| | | | | |
|---|---|---|---|---|
| 2008/0260978 | A1* | 10/2008 | Van Hove | B65D 83/771 264/328.8 |
| 2010/0276447 | A1* | 11/2010 | Patrini | B29C 49/18 222/105 |
| 2011/0024380 | A1 | 2/2011 | Moretti | |
| 2011/0227258 | A1 | 9/2011 | Patrini | |
| 2012/0132607 | A1* | 5/2012 | Landman | B29B 11/08 264/537 |
| 2012/0207413 | A1* | 8/2012 | Moretti | B29C 49/071 264/513 |

FOREIGN PATENT DOCUMENTS

| | | | |
|---|---|---|---|
| DE | 102019120624 | A1 | 2/2021 |
| EP | 2246267 | A2 | 11/2010 |
| EP | 2489608 | A1 | 8/2012 |

* cited by examiner

DISPENSER CONTAINER AND METHOD FOR PRODUCING A DISPENSER CONTAINER

CROSS-REFERENCE TO RELATED APPLICATIONS

This application claims priority from German patent application No. DE 10 2022 113 840.2 filed Jun. 1, 2022, the disclosure of which is hereby incorporated herein in its entirety by reference.

FIELD OF THE INVENTION

The present invention relates to a dispenser container with an outer container and inner container for holding a filler material, as well as a method for producing such a dispenser container.

BACKGROUND OF THE INVENTION

Dispenser containers with an outer and an inner container are known from the prior art in various forms. The filler material of the prior art dispenser containers is always held in the respective inner container.

For example, dispenser containers are known that consist of an elastically deformable outer container and a plastically deformable inner container arranged in this outer container. The dimensional stability of the outer container is here selected in such a way that the latter returns back to its original shape after the outer container is compressed. The inner container consists of a plastically deformable material, so that it folds together almost completely when exposed to pressure, and can thus be readily emptied. In order for the outer container to retain its aesthetically appealing shape, a pressure equalization in the space between the outer and inner containers must be ensured.

In this context, for example, DE 40 27 539 A1 describes a squeeze bottle with an essentially dimensionally stable, yet elastically deformable outer container, inside of which an easily deformable inner container is arranged. A closure seals the space between the inner and outer container. The closure has a sealing lip, through which air can flow into the intermediate space as soon as the process of pressing out the tube contents has concluded. This ensures that the outer container will assume its original shape once again.

In an alternative type of dispenser container, the dispensing process does not take place by compressing the container, but rather by generating negative pressure in the container with the help of a pump and a suction tube extending into the filler material. This type of dispenser container makes it possible to use outer containers made out of a dimensionally stable material. As has been demonstrated, this is because an outer container made out of a dimensionally stable material, in particular such as glass, is perceived by many consumers as more valuable in comparison to an outer container made out of a deformable material, so that products offered in such a glass container often sell better than the same products in a deformable plastic container.

For example, this type of dispenser containers, e.g., as described in DE 10 2019 120 624 A1, is used for the dosed delivery dispensing of cosmetic or medical products present as fluids.

DE 10 2014 113 535 A1 describes a dispenser container consisting of an outer container and an inner container. In this case, outer containers and inner containers are composed of two different blow-molded plastics, wherein the two plastics do not enter into any material connection with each other. The plastic comprising the inner container here has a higher elasticity than the plastic comprising the outer container, so that the inner container is deformed by a negative pressure acting upon it, while the outer container remains dimensionally stable. The outer container has a pressure equalization opening for equalizing pressure in the area between the outer container and inner container.

The dispenser container in DE 10 2014 113 535 A1 is manufactured in a spray bow molding process, wherein a preform is first produced. In order to form a preform, a first layer is sprayed onto a blow mold core located in a first cavity of a multicomponent injection molding device in a first step. The inner container of the dispenser container is subsequently formed out of this first layer. The blow mold core with the first layer located thereon is then introduced into a second cavity. A second layer is then sprayed onto the blow mold core located in the second cavity of the multicomponent injection molding device. The outer container of the dispenser container is subsequently formed out of this second layer. In an additional process stage, the preform is brought to a temperature required for stretch blow molding, introduced into a stretch blow molding device, and there expanded to the desired dispenser container with a flexible inner container and dimensionally stable outer container.

Finally known from prior art as well are dispenser containers in which a plastic container made out of a flexible material is formed inside of a dimensionally stable outer container in a blowing process. For example, EP 2 246 267 B1 discloses a dispenser container consisting of an outer, rigid container as well as a collapsible bag accommodated in the interior of the outer container. The collapsible bag is introduced as a preform consisting of a thermoplastic material into the interior of the outer container and there inflated in a blowing process. The resultantly formed bag yields a flexible, pressure-compressible inner container. The dimensionally stable outer container can consist of glass, aluminum or a corresponding plastic.

US 2007/0267437 A1 describes a similarly constructed dispenser container. This dispenser container is also provided with an inner container with a variable volume, which is accommodated in an outer container made out of a rigid material, e.g., aluminum. The inner container manufactured out of a preform in a stretch blow molding process consists of a hard, temperature-resistant plastic such as Nylon 66 in its neck section, and of a softer, flexible plastic such as PET in its bag area.

The problem encountered during the manufacture of the type of dispenser containers described in EP 2 246 267 B1 and US 2007/0267437 A1 is that, while forming the inner container by expanding a preform inside of the rigid outer container, the air trapped in the outer container is often unable to completely escape, because the forming inner container comes into contact with the wall of the outer container in the upper area of the outer container, i.e., in the area adjacent to the outer container nipple, already at a time where the air from the lower volume of the outer container, i.e., from the area adjacent to the outer container bottom (16), has not yet completely flowed out of the outer container.

As the preform expands, the inner container gains volume from the top down, so to speak, as a result of which the air in the lower area is trapped. As a consequence, the inner container does not form with the actually desired volume, which leads to difficulties in filling with filling material and to an undesired dead volume in the outer container. This problem is encountered especially frequently in outer containers with a pronounced outer container shoulder, such that a complete escape of air from the lower volume of the outer container is in no case achieved during the expansion of the inner container.

Therefore, a need exists for dispenser containers and methods for their production in which a flexible inner container takes up the volume of a dimensionally stable outer container as completely as possible.

SUMMARY OF THE INVENTION

The object of the invention as characterized in the claims is to provide a method for producing a dispenser container that makes it possible to arrange a flexible inner container inside of a dimensionally stable outer container, wherein the inner container accommodates the volume of the outer container as completely as possible.

The method according to the invention for producing a dispenser container encompasses the following steps:

a) Providing an outer container comprised of a dimensionally stable material, wherein the outer container has an outer container bottom, an outer container body and an outer container nipple with an outer container opening, b) Providing a preform, wherein the preform has a cup-like molded body, wherein the molded body is constructed from at least two portions, wherein a first portion forms a closed end of the molded body and a second portion forms an open end of the molded body, wherein the closed end lies opposite the open end, wherein the first portion is provided to form an inner container body, and the second portion to form an inner container dispersing portion having a dispersing opening, wherein the first portion consists of a blow-moldable elastic plastic, wherein the second portion consists of a dimensionally stable plastic, wherein the second portion has a slot-like recess on its outer surface to form a vent duct, c) Heating the preform, d) Introducing the preform into the outer container and introducing a stretch blow molding pin into the preform, wherein the stretch blow molding pin is introduced into the preform before or after the preform is introduced into the outer container, e) Stretch blow molding to form an inner container while expelling the air contained in the space located between the preform and the outer container, wherein the air escapes into the environment via the at least one vent duct.

According to the invention, an inner container is formed using a preform, whose second portion provided to form the inner container dispensing portion has at least one slot-like recess on its outer surface. As a result, the air forced out of the space located between the preform and the outer container during the stretch blow molding process so as to form the inner container is provided with the ability to escape into the environment via the vent duct formed by the slot-like recess.

Combining the features of the method according to the invention for producing a dispenser container ensures that, regardless of the type of outer container, the air will completely escape from the entire volume of the outer container, to include in particular from the area of the outer container bottom, while expanding the inner container. As a result, the inner container forms as desired, and fills the volume of the outer container, ideally practically completely. In this way, the dead volume between the inner container and outer container in the bottom area of the outer container well known from prior art is avoided, and the inner container can be easily and completely equipped with filling material.

After stretch blow molding to form the inner container, the dispenser container is cooled, the stretch blow molding device is removed, and the dispenser container can be directly provided with filling material.

Preferably, stretch blow molding is carried out in step e) until an outer surface of the inner container body is in contact with an inner surface of the outer container over at least 90%, preferably over at least 99%, of the expansion of the outer container bottom. The outer surface of the inner container body is especially preferably in contact with the inner surface of the outer container over essentially the entire expansion of the outer container bottom, preferably over the entire expansion of the outer container bottom.

In this case, stretch blow molding takes place at least until such time as the outer surface of the inner container body is in contact with the inner surface of the outer container over essentially the entire expansion of the outer container bottom.

Within the framework of the present text, the term “expansion of the outer container bottom” refers to the respective surface area of the outer container bottom. If the outer surface of the inner container body is in contact with the inner surface of the outer container over at least 90% of the expansion of the outer container bottom, it thus means that the outer surface of the inner container body is in contact with the inner surface of the outer container over at least 90% of the surface area of the inner surface of the outer container bottom. The same holds true for the expansion of the outer container body and outer container shoulder.

Preferably, in step e), stretch blow molding is carried out until such time that the outer surface of the inner container body is in contact with the inner surface of the outer container over at least 90% of the expansion of the outer container body. This preferred embodiment ensures that the air essentially escapes from the entire volume of the outer container, and in particular from the area of the outer container body, completely during the expansion of the inner container, regardless of the type of outer container. As a result, the inner container forms in the manner desired, and practically completely fills the volume of the outer container, to include in particular in the area of all possibly present corners of the outer container. This avoids dead volume in the outer container, and the inner container can be easily and completely equipped with filling material.

According to another preferred embodiment of the present invention, stretch blow molding is carried out in step e) until such time that the outer surface of the inner container body is in contact with the inner surface of the outer container over at least 99% of the expansion of the outer container body. In this case, the inner container and the outer container are in contact with each other over essentially the entire expansion of an inner surface of the outer container body. This embodiment ensures in an ideal manner that the air completely escapes from the entire volume of the outer container, and in particular also from the area of the outer container body, during the expansion of the inner container, regardless of the type of outer container, and in particular also in the case of an outer container with a pronounced outer container shoulder. As a result, the inner container forms in the manner desired, and practically completely fills the volume of the outer container, to include in particular in the area of all possibly present corners of the outer container.

This avoids dead volume in the outer container, and the inner container can be easily and completely equipped with filling material.

The outer surface of the inner container body is preferably in contact with the inner surface of the outer container over essentially the entire expansion of the outer container bottom, and in addition over at least 99% of the expansion of the outer container body.

According to an especially preferred embodiment of the present invention, the outer container provided in step a) also has an outer container shoulder in addition to the outer container bottom, the outer container body and the outer container nipple. In step e), stretch blow molding is carried out until such time that the outer surface of the inner container body is in contact with the inner surface of the outer container over at least 90% of the expansion of the outer container shoulder.

According to another preferred embodiment of the present invention, the outer container provided in step a) has an outer container bottom, an outer container body, an outer container nipple and an outer container shoulder. Stretch blow molding according to step e) is carried out until such time that the outer surface of the inner container body is in contact with the inner surface of the outer container over at least 99% of the expansion of the outer container shoulder. This embodiment ensures in an ideal manner that the air completely escapes from the entire volume of the outer container, and in particular also from the area of the outer container body, during the expansion of the inner container, regardless of the type of outer container, and in particular also in the case of an outer container with a pronounced outer container shoulder. As a result, the inner container forms in the manner desired, and practically completely fills the volume of the outer container, to include in particular in the area of all other possibly present corners of the outer container. This avoids dead volume in the outer container, and the inner container can be easily and completely equipped with filling material.

Especially preferred are embodiments in which the outer surface of the inner container body is in contact with the inner surface of the outer container over essentially the entire expansion of the outer container bottom, over essentially the entire expansion of the outer container body and over at least 90%, preferably at least 99%, of the expansion of the outer container shoulder. In this case, the inner container and the outer container are in contact with each other not just over the entire expansion of an inner surface of the outer container bottom and the outer container body, but additionally over the vast majority of the expansion of the outer container shoulder.

It is understood that, based on the fact that a vent duct extending from the space between the preform and the outer container up to the environment is formed, the inner container dispensing portion comprised of a dimensionally stable plastic extends in the direction of the dispenser container longitudinal axis over the entire expansion of the outer container nipple. This establishes a fluid connection between the environment and the space located between the preform and the outer container.

It is also understood that a certain degree of vagueness is associated with expressions like “completely escaping air”, “be in contact over the entire expansion”, etc. The air does not “completely” escape from the space between the inner container and outer container in the sense of forming a vacuum, but only “completely” in the sense that no visible bubbles or inclusions of air remain between the outer and inner container. An “entire expansion” can likewise not mean 100% from a mathematical standpoint, but rather only denotes the fact that no visible areas remain in which the inner container is not in contact with the outer container in the corresponding container portion, e.g., container bottom.

Within the framework of the present text, the expressions “space located between the inner container and the outer container” and “space located between the preform and the outer container” are used synonymously. As explained, a preform is first introduced into the outer container, which is subsequently formed into an inner container in a stretch blow molding process. Depending on the progress of the stretch blow molding process, reference can at a specific point in time still be made to a preform, but also already to an inner container.

An outer container used within the framework of the present invention can be divided into the portions of: outer container bottom, outer container body, outer container nipple and outer container shoulder. These terms are known to the person skilled in the art. The person skilled in the art is also aware that a sharp delineation of individual portions is difficult given the extremely high variety of geometric shapes of outer containers. Despite this fact, the person skilled in the art has no problem determining the individual portions outer container bottom, outer container body, outer container nipple and outer container shoulder and delineating them from each other for outer containers of any shape. The outer container bottom is suitable in all cases for placing the outer container on a substrate. And this also holds true given an “upside down” placement, e.g., on a closure cap secured to the outer container, during use of the dispenser container as intended. The outer container body limits the part of the outer container that holds the filler material in a horizontal direction. This also holds true for dispenser containers with a dispenser container longitudinal axis that does not run vertically to the substrate. The optional outer container shoulder connects the outer container body with the outer container nipple, which is often equipped with an outer thread.

The present invention also relates to a dispenser container with an outer container comprised of a dimensionally stable material and an inner container arranged inside of the outer container for holding a filler material, wherein the outer container has an outer container bottom, an outer container body and an outer container nipple having an outer container opening. The inner container comprises an inner container body located in the area of the outer container body and an inner container dispensing portion having a dispensing opening and arranged in the area of the outer container nipple, wherein the inner container dispensing portion extends in the direction of a dispenser container longitudinal axis over the entire expansion of the outer container nipple. The inner container body consists of a blow-molded elastic plastic, while the inner container dispensing portion consists of a dimensionally stable plastic. According to the invention, the surface of the inner container dispensing portion facing the outer container nipple has at least one slot-like recess for forming at least one vent duct, wherein the vent duct forms a fluid connection between the environment and a space located between the inner container and the outer container. The outer surface of the inner container body is in contact with the inner surface of the outer container over at least 90% of the expansion of the outer container bottom.

The dispenser container according to the invention overcomes the problem known from prior art, in which the inner container increases in volume from the top down during the expansion of the preform, thereby trapping the air in the lower area. The inner container is formed completely with the entire desired volume, which avoids difficulties in the process of filling with filler material and an undesired dead volume in the outer container.

According to the invention, the outer container is comprised of a dimensionally stable material. Within the framework of the present text, “dimensionally stable” means that a container comprised of a dimensionally stable material only deforms to a negligent extent or not at all given the usual pressures that arise while using a dispenser container.

The filler material can be any substance with a low enough viscosity for the dispensing process. Pastes, cremes, gels and liquids are preferably used as the filler material.

The outer surface of the inner container body is preferably in contact with the inner surface of the outer container over at least 99% of the expansion of the outer container bottom. These preferred embodiments ensure that, regardless of the type of outer container, the inner container practically completely fills the volume of the outer container in the desired manner, to include in particular in the area of all possibly present corners of the outer container.

As a consequence, dead volume in the outer container is avoided, and the inner container can be easily and completely equipped with filler material.

The outer surface of the inner container body is especially preferably in contact with the inner surface of the outer container over essentially the entire expansion of the outer container bottom, preferably over the entire expansion of the outer container bottom.

The outer surface of the inner container body is preferably in contact with the inner surface of the outer container over at least 90%, especially preferably over at least 99%, of the expansion of the outer container body. These preferred embodiments ensure that, regardless of the type of outer container, the inner container practically completely fills the volume of the outer container in the desired manner, to include in particular in the area of all possibly present corners of the outer container. As a consequence, dead volume in the outer container is avoided, and the inner container can be easily and completely equipped with filler material.

The outer surface of the inner container body is preferably in contact with the inner surface of the outer container over essentially the entire expansion of the outer container bottom, and additionally over at least 99% of the expansion of the outer container body.

According to another preferred embodiment of the present invention, the outer container has an outer container bottom, an outer container body, an outer container nipple and an outer container shoulder, wherein the outer surface of the inner container body is in contact with the inner surface of the outer container over at least 90%, in particular preferably over at least 99%, of the expansion of the outer container shoulder. These preferred embodiments ensure that, regardless of the type of outer container and in particular also in the case of an outer container with a pronounced outer container shoulder, the inner container practically completely fills the volume of the outer container in the desired manner, to include in particular in the area of the outer container shoulder and in the area of all other possibly present corners of the outer container. As a consequence, dead volume is avoided in the outer container, and the inner container can be easily and completely equipped with filler material.

Especially preferred are embodiments in which the outer surface of the inner container body is in contact with the inner surface of the outer container over essentially the entire expansion of the outer container bottom, over essentially the entire expansion of the outer container body and over at least 90%, preferably at least 99%, of the expansion of the outer container shoulder. In this case, the inner container and the outer container are in contact with each other not just over the entire expansion of an inner surface of the outer container bottom and the outer container body, but additionally over the vast majority of the expansion of the outer container shoulder.

According to another preferred embodiment of the present invention, the inner container dispensing portion has a continuous collar portion in an area adjacent to the dispensing opening, wherein the collar portion abuts flush against an edge area of the outer container nipple facing away from the outer container body. On its surface abutting flush against the edge area of the outer container nipple facing away from the outer container body, the collar portion has a slot-like recess that goes around the dispensing opening to form a vent slot and at least one slot-like recess extending away from the dispensing opening to form at least one vent cutout. The at least one slot-like recess to form at least one vent duct is fluidically connected with the slot-like recess to form a vent slot, and the slot-like recess to form the vent slot is fluidically connected with the slot-like recess to form the vent cutout, wherein the vent duct, the vent slot and the vent cutout form a fluidic connection between the environment and a space located between the inner container and the outer container.

According to a preferred embodiment of the present invention, the slot-like recess to form a vent slot provided in the collar portion and running around the dispensing opening runs concentrically to the dispensing opening. This type of vent slot can be manufactured especially easily, and ensures an additionally improved venting of the volume between the outer container and inner container during the expansion of the inner container. The outer container nipple of a dispenser container usually has a cylindrical shape, since a closure or a pump head is as a rule screwed on.

Special advantages arise if the inner container dispensing portion has several slot-like recesses on its surface facing the outer container nipple to form several vent ducts. In this case, the vent ducts can be arranged as desired over the entire circumference of the inner container dispensing portion. The vent ducts are all fluidically connected with the circumferential vent slot, as a result of which the air forced out of the outer container can exit over the entire circumference of the inner container dispensing portion. The displaced air is guided into the vent slot, and released into the environment by way of the vent cutout. The arrangement of vent ducts can be adjusted to any geometric features of the outer container. If the latter is asymmetrical in design and has an area expected to have an especially inhibited venting of the volume between the outer container and inner container, an especially high number of vent ducts can be provided in the corresponding area of the inner container dispensing portion.

The slot-like recesses to form the vent ducts preferably run parallel to each other and especially preferably parallel to the dispenser container longitudinal axis. According to this embodiment, venting takes place directly, and is therefore particularly effective.

The slot-like recesses to form the vent ducts are preferably provided evenly distributed over the circumference of the inner container dispensing portion. Since the outer containers are often symmetrical in design, venting that is uniformly effective over the entire circumference should advantageously take place during the stretch blow molding process.

According to another especially preferred embodiment, the collar portion has several slot-like recesses to form several vent cutouts extending away from the dispensing opening. In this case, the vent cutouts can be arranged as desired over the entire circumference of the inner container dispensing portion. The vent cutouts are all fluidically connected with the circumferential vent slot, as a result of which the air forced out of the outer container can exit over the entire circumference of the inner container dispensing portion. The displaced air is guided into the vent slot, and released into the environment by way of the vent cutouts. The arrangement of vent cutouts can be adjusted to any geometric features of the outer container. If the latter is asymmetrical in design and has an area expected to have an especially inhibited venting of the volume between the outer container and inner container, an especially high number of vent cutouts can be provided in the corresponding area of the inner container dispensing portion.

The slot-like recesses to form the vent cutouts are preferably provided evenly distributed over the circumference of the inner container dispensing portion. Since the outer containers are often symmetrical in design, venting that is uniformly effective over the entire circumference should advantageously take place during the stretch blow molding process.

Special advantages with respect to effective venting during the stretch blow molding process result when several slot-like recesses to form several vent ducts are combined with several slot-like recesses to form vent cutouts. While the number of vent ducts is here basically independent of the number of vent cutouts, an especially uniform and unrestricted airflow arises during the stretch blow molding process if the number of vent ducts corresponds with the number of vent cutouts, and the latter are distributed in an identical manner over the circumference of the inner container dispensing portion. In this case, the outflowing air can flow directly from a vent duct via the vent slot into the corresponding vent cutout.

The outer container nipple is preferably equipped with a male thread. A pumping device of any desired design for removing the filler material present in the inner container can be screwed onto the male thread. However, a closure cap by itself can also be provided, which seals the outer container opening provided at the end of the outer container nipple facing away from the outer container body.

The configuration of the fluid connection between the environment and the space located between the preform and the outer container by means of at least one slot-like recess to form at least one vent duct on the surface of the inner container dispensing portion facing the outer container nipple, a slot-like recess running around the dispensing opening to form a vent slot on the surface of the collar portion that abuts flush against the edge area of the outer container nipple facing away from the outer container body, as well as a slot-like recess extending away from the dispensing opening to form at least one vent cutout on the surface of the collar portion that abuts flush against the edge area of the outer container nipple facing away from the outer container body has proven ideal for discharging the air located in the space between the preform and the outer container during the stretch blow molding process. Due to the vent slot running around the dispensing opening, both the vent duct and vent cutout can be positioned as desired on the entire circumference of the inner container dispensing portion, and also arranged as desired relative to each other. The circumferential vent slot in each case ensures a fluid connection between the vent duct and vent cutout. The vent cutout and vent duct are here fluidically connected with the circumferential vent slot, and the fluid connection of the space to the outside atmosphere located between the inner container and the outer container is formed via the vent duct, the vent slot and the vent cutout.

The dimensionally stable material of the outer container especially preferably consists of glass, plastic, metal, a metal alloy or a composite material. In terms of the present invention, "dimensionally stable" is understood to mean that a corresponding outer container or a corresponding plastic only deforms to a negligibly small extent or not at all at the pressures and/or negative pressures that arise while using the dispenser container.

The blow molded elastic plastic of the inner container body is preferably a thermoplastic material, in particular a polyamide, a polyolefin or a polycarbonate. Polyethylene terephthalate, polyvinyl chloride, polyethylene or polypropylene are especially preferably used. The mentioned materials exhibit especially advantageous properties with regard to melting temperature and viscosity, and are especially well suited for blow molding processes.

The blow-molded elastic plastic of the inner container body of the inner container and the dimensionally stable plastic of the inner container dispensing portion especially preferably have different viscosities and/or melting temperatures. As a result, a broad spectrum of plastics can be combined with each other. The plastic of the inner container body can be adjusted to the requirements of the filler material stored therein.

According to another especially preferred embodiment of the present invention, the dimensionally stable plastic of the inner container dispensing portion has a higher melting temperature than the blow-molded elastic plastic of the inner container body. As a result, the properties desired for expanding the preform with the formation of the inner container are especially well satisfied. A temperature can be set at which the elastic plastic of the inner container body already melts and has a low viscosity, while the dimensionally stable plastic of the inner container dispensing portion is present with an unchanged dimensional stability. The preform can then smoothly expand with the formation of the inner container body.

The present invention also comprises a dispenser container as described above, which was manufactured in one of the processes described above.

The preform used in a process according to the invention has a cup-like molded body, and consists of at least two portions, wherein a first portion forms a closed end of the molded body, and a second portion forms an open end of the molded body, wherein the closed end lies opposite the open end. The first portion of the preform is provided to form an inner container body, and the second portion of the preform is provided to form an inner container dispensing portion with a dispensing opening. The first portion consists of a blow-moldable elastic plastic, and the second section consists of a dimensionally stable plastic.

The second portion has a circumferential collar portion in its area adjacent to the open end of the cup-like molded body. On its outer surface, the second portion has at least one slot-like recess to form at least one vent duct. On its surface facing the first portion, the collar portion has a slot-like recess running around the dispensing opening to form a vent slot, and at least one slot-like recess extending away from the dispensing opening to form at least one vent cutout. The at least one slot-like recess to form at least one vent duct is fluidically connected with the slot-like recess to form a vent slot. The slot-like recess to form the vent slot in turn is fluidically connected with the vent cutout.

The preform is used to manufacture an inner container for one of the dispenser containers described above. The preform has all features required to obtain the corresponding feature combination of the dispenser container consisting of the outer container and inner container. The expansion of the preform inside of a dimensionally stable outer container leads to the dispenser container according to the invention. All advantages discussed in conjunction with the dispenser container and the components outer container and inner container forming such a dispenser container are also derived in conjunction with the preform according to the invention. The same also holds true for the preferred embodiments of the preform indicated below.

The blow-moldable elastic plastic of the first portion of the preform preferably involves a thermoplastic material, in particular a polyamide, a polyolefin or a polycarbonate. Polyethylene terephthalate, polyvinylchloride, polyethylene and polypropylene are especially preferred.

According to an especially preferred embodiment, the dimensionally stable plastic of the second portion of the preform has a higher melting temperature than the blow moldable elastic plastic of the first portion.

According to another, especially preferred embodiment, the second portion of the preform has several slot-like recesses on its outer surface to form several vent ducts. These several slot-like recesses to form the several vent ducts especially preferably run parallel to each other, and these several slot-like recesses are especially preferably uniformly distributed over the circumference of the second portion. The advantages associated with these embodiments were already discussed in conjunction with the corresponding embodiments of the dispenser container.

The slot-like recess to form a vent slot provided on the surface of the collar portion facing the first portion and running around the dispensing opening is especially preferably designed concentrically to the dispensing opening.

According to another preferred embodiment, the surface of the collar portion facing the first portion has several slot-like recesses to form several vent cutouts extending away from the dispensing opening. These slot-like recesses to form the vent cutouts are especially preferably uniformly distributed over the circumference of the inner container dispensing portion. In this case as well, the advantages to the preferred embodiments were already discussed in conjunction with the corresponding embodiments of the dispenser invention container.

BRIEF DESCRIPTION OF THE DRAWINGS

The invention will be described in more detail below based on exemplary embodiments in conjunction with the drawings. Let it be expressly noted that the invention is not to be limited to the indicated examples. Shown on.

DETAILED DESCRIPTION OF THE INVENTION

Figure 1:
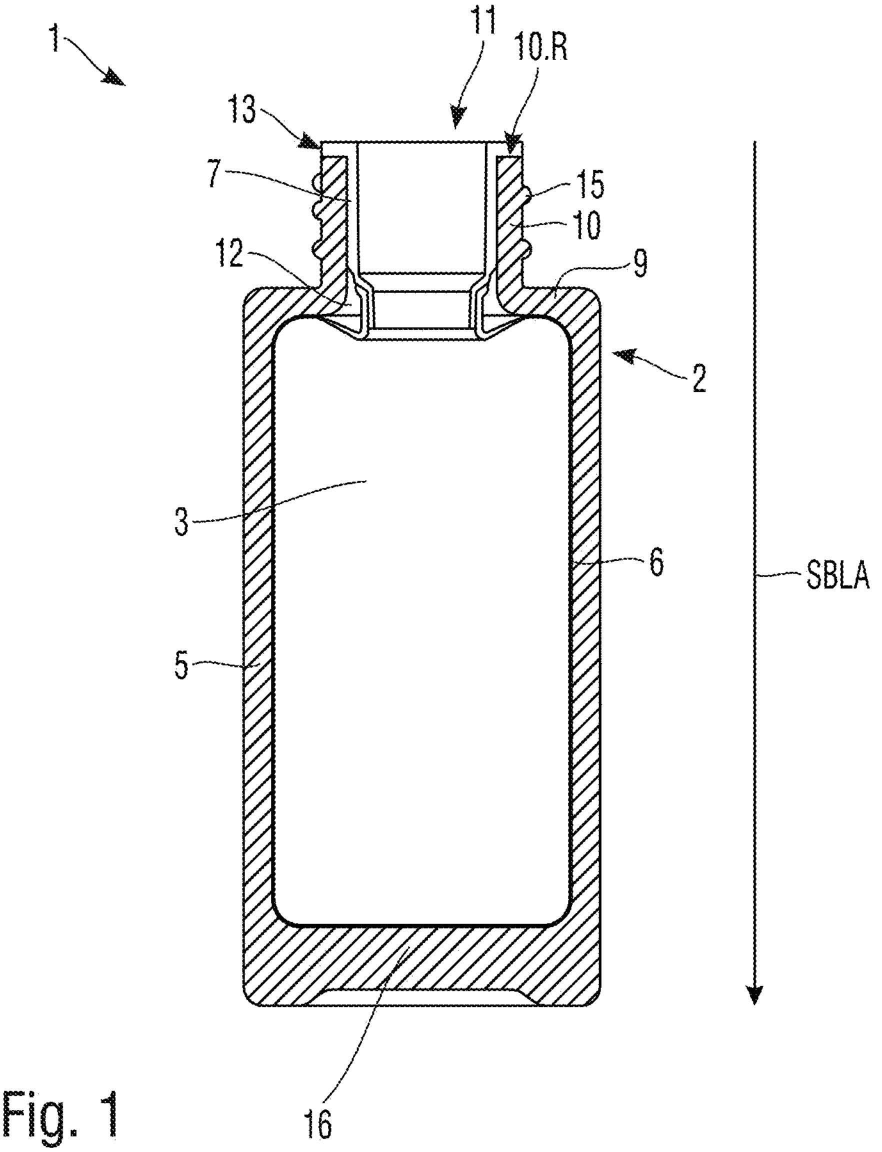
FIG. 1 is a vertical section of a dispenser container according to the invention.

FIG. 1 shows a vertical section of a dispenser container 1. The dispenser container 1 comprises an outer container 2 and an inner container 3 arranged inside of the outer container 2. A filler material can be accommodated inside of the inner container 3.

In the exemplary embodiment shown, the outer container 2 is comprised of an outer container bottom 16, an outer container body 5, an outer container shoulder 9 and an outer container nipple 10. The outside of the outer container nipple 10 is equipped with a male thread 15. A pumping device designed as desired can be screwed onto the male thread 15 for removing the filler material. However, a closure lid can also be screwed on, which seals the outer container opening provided on the upper end of the outer container nipple 10, meaning the one facing away from the outer container body 5.

The outer container 2 consists of a dimensionally stable material. In the exemplary embodiment shown, the outer container 2 is made of glass.

The inner container 3 has an inner container body 6 arranged in the area of the outer container body 5 and an inner container dispensing portion 7 having a dispensing opening 11 arranged in the area of the outer container nipple 10. The inner container dispensing portion 7 extends in the direction of a dispenser container longitudinal axis SBLA over the entire expansion of the outer container nipple 10 until into the area of the outer container shoulder 9.

The inner container body 6 consists of a blow-molded elastic plastic, and the inner container dispensing portion 7 consists of a dimensionally stable plastic. In the exemplary embodiment shown on FIG. 1, the inner container body 6 is made of polyethylene, and the inner container dispensing portion 7 is made of a crosslinked polyurethane.

As evident from FIG. 1, the stretch blow molding process to form the inner container was carried out until such time that the outer surface of the inner container body 6 is in contact with the inner surface of the outer container 2 over the entire expansion of the outer container bottom 15, the entire expansion of the outer container body 5 and over more than 90% of the expansion of the outer container shoulder 9. The inner container and the outer container are thus in contact with each other not just over the entire expansion of the inner surface of the outer container bottom 16 and over the entire expansion of the inner surface of the outer container body 5, but additionally over the vast majority of the expansion of the outer container shoulder 9.

Figure 2A:
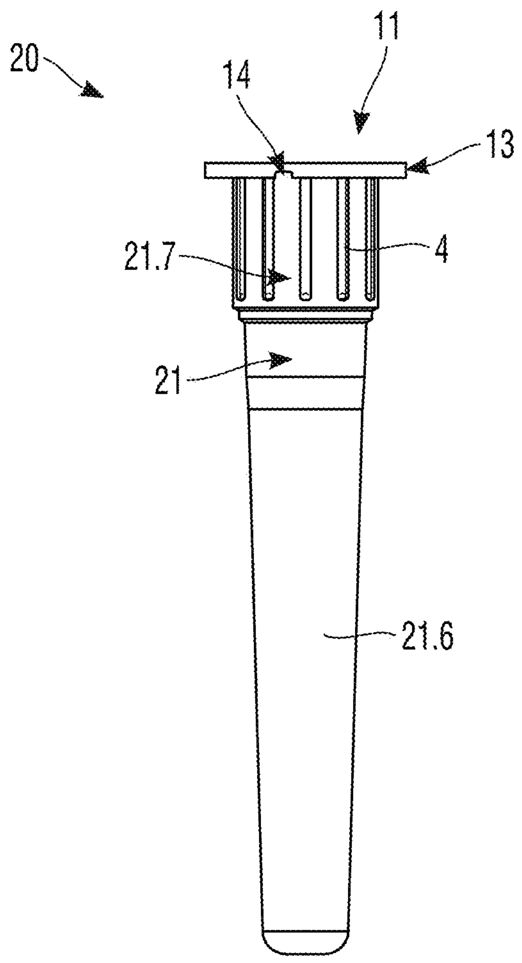
FIG. 2A is a side view of a preform according to the invention.
Figure 2B:
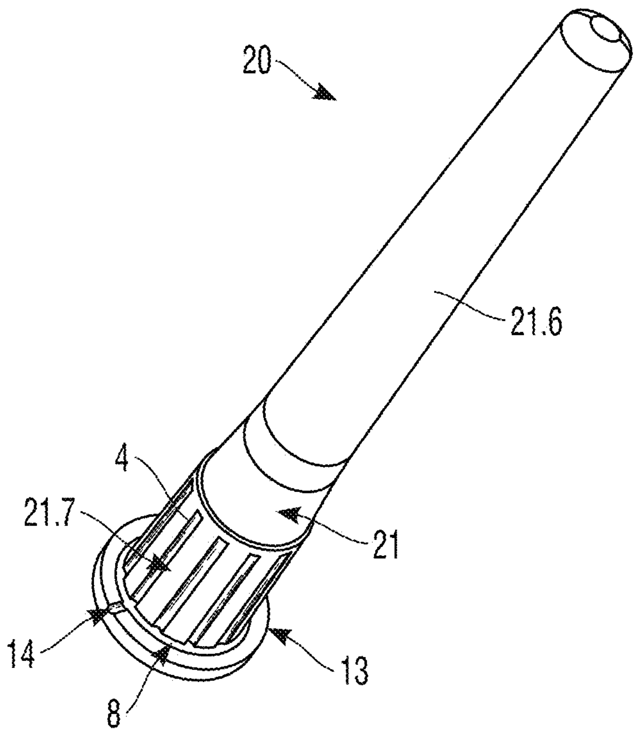
FIG. 2B is a perspective view of the preform on FIG. 2A from diagonally below.

Additional features and properties of the inner container dispensing portion 7 are illustrated on FIGS. 2A and 2B, which show a preform 20 as viewed from the side (FIG. 2A) and in perspective from diagonally below (FIG. 2B). Such a preform is used for manufacturing an inner container 3 for a dispenser container 1 of the kind shown on FIG. 1. The preform 20 has a cup-like molded body 21, and is constructed from two portions 21.6, 21.7. The first portion 21.6 forms the closed end of the molded body 21, while the second portion 21.7 forms the open end of the molded body 21, wherein the closed end lies opposite the open end.

The first portion 21.6 is provided to form the inner container body 6, and the second portion 21.7 is provided to form the inner container dispensing portion 7. The first section 21.6 consists of a blow-moldable elastic plastic, in the present case of polyethylene, while the second portion 21.7 consists of a dimensionally stable plastic, in the present case of a crosslinked polyurethane.

On FIGS. 2A and 2B, the dispensing opening provided at the upper end, meaning at the end of the inner container dispensing portion 7 facing away from the first portion 21.6 (see FIG. 1) is marked with reference number 11. The outer surface of the second portion 21.7 provided to form the inner container dispensing portion 7 has several slot-like recesses to form a corresponding number of vent ducts 4. The slot-like recesses run parallel to each other and parallel to the dispenser container longitudinal axis SBLA (see FIG. 1). The exemplary embodiment shown has a total of ten slot-like recesses to form a corresponding number of vent ducts 4.

Also clearly evident on FIGS. 2A and 2B is the circumferential collar portion 13 provided in an area of the inner container dispensing portion 7 adjacent to the dispensing opening 11. A slot-like recess is provided in the collar portion 13 for the subsequent formation of a vent cutout 14.

Shown in the perspective view on FIG. 2B is the slot-like recess to form a vent slot 8, which runs concentrically around the dispensing opening 11 and is present in the surface of the collar portion 13 provided so as to abut flush against the edge area of the outer container nipple 10 facing away from the outer container body 5.

The slot-like recess to form the vent cutout 14 and the slot-like recesses to form the vent ducts 4 are here fluidically connected with the circumferential, slot-like recess to form a vent slot 8. After the preform 20 has been introduced into the outer container 2, these recesses correspondingly form the vent duct, the vent slot and the vent cutout, as a result of which a fluid connection is formed between the space 12 (see FIG. 3A) located between the preform 20 and the outer container 2 and the outside atmosphere.

In the dispenser container 1 on FIG. 1, the vent ducts are arranged on the surface of the inner container dispensing portion 7 facing the outer container nipple 10. The collar element 13 abuts flush against an edge area 10.R of the outer container nipple 10 facing away from the outer container shoulder 9. The vent cutout provided in the collar element 13 is fluidically connected with the circumferential vent groove and the vent ducts, and in this way establishes a fluid connection of the space 12 located between the inner container 3 and the outer container 2 to the outside atmosphere. The vent cutout, the vent groove and the vent ducts are not visible in the sectional view on FIG. 1.

Figure 3A:
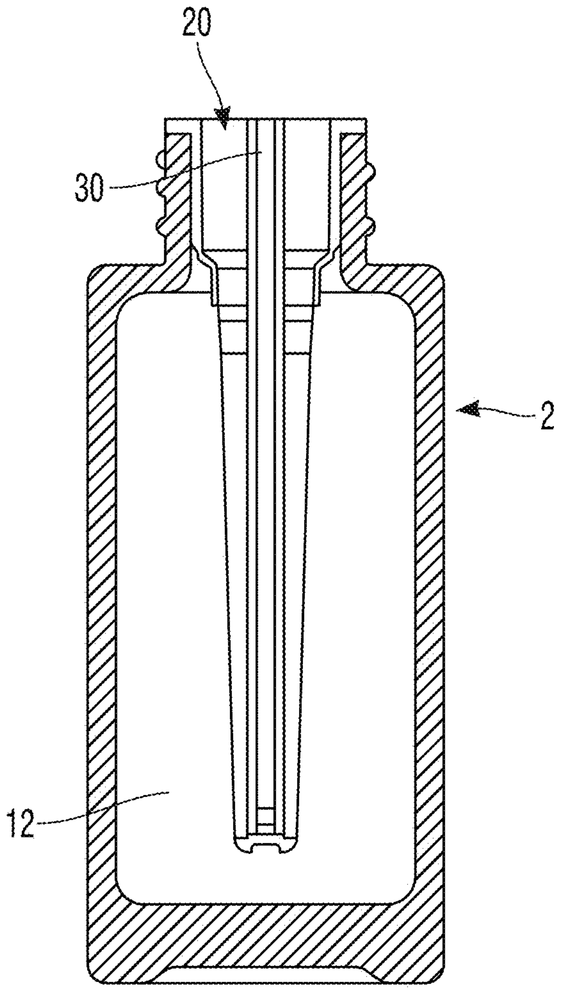
FIG. 3A is an outer container with preform and stretch blow molding pin before the blow molding process.

The method according to the invention for manufacturing a dispenser container 1 as shown on FIG. 1 will be described below based on FIGS. 3A and 3B. An outer container 2 is first provided (see FIG. 3A), which corresponds to the outer container 2 described in conjunction with FIG. 1. In addition, a preform 20 is provided, the properties and features of which have already been discussed in conjunction with FIGS. 2A and 2B. The preform 20 is heated to a temperature sufficient for a stretch blow molding process, introduced into the outer container 2, and a stretch blow molding pin 30 is introduced into the preform 20, resulting in the configuration shown on FIG. 3A. The stretch blow molding pin 30 can also be introduced into the preform 20 before the preform 20 is introduced into the outer container 2.

Figure 3B:
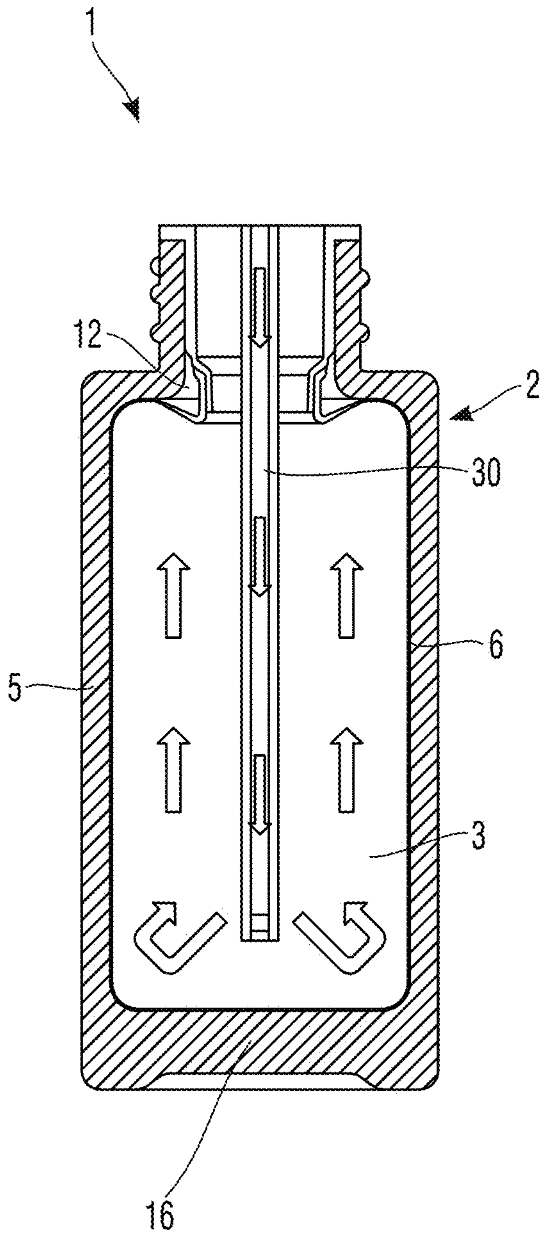
FIG. 3B is an outer container with inner container and stretch blow molding pin during the blow molding process.

A stretch blow molding process is then performed, wherein the flow of introduced gas is symbolized on FIG. 3B by several arrows. The stretch blow molding process yields the inner container 3. The air contained in the space 12 located between the preform 20 and the outer container 2 (FIG. 3A) is here displaced, escaping through the vent ducts, the vent groove and the vent cutout into the environment. Stretch blow molding to form the inner container is performed until the outer surface of the inner container body 6 is in contact with the inner surface of the outer container 2 over the entire expansion of the outer container bottom 15, the entire expansion of the outer container body 5 and over more than 90% of the expansion of the outer container shoulder 9. As a result, the inner container 3 forms in the desired manner, and fills the volume of the outer container 2 practically completely (see FIG. 3B), to include in particular in the area of the outer container shoulder 9.

The invention claimed is:

1. A method for producing a dispenser container comprising the following steps:

a) Providing an outer container comprised of a dimensionally stable material, wherein the outer container has an outer container bottom, an outer container body and an outer container nipple with an outer container opening, b) Providing a preform, wherein the preform has a molded body, wherein the molded body is constructed from at least two portions, wherein a first portion forms a closed end of the molded body and a second portion forms an open end of the molded body, wherein the closed end lies opposite the open end, wherein the first portion is provided to form an inner container body, and the second portion to form an inner container dispensing portion having a dispensing opening, wherein the first portion consists of a blow-moldable elastic plastic, wherein the second portion consists of a dimensionally stable plastic, wherein the second portion has a recess on its outer surface to form a vent duct, c) Heating the preform, d) Introducing the preform into the outer container and introducing a stretch blow molding pin into the preform, wherein the stretch blow molding pin is introduced into the preform before or after the preform is introduced into the outer container, e) Stretch blow molding to form an inner container while expelling air contained in a space located between the preform and the outer container, wherein the air escapes into an environment via the vent duct.

2. The method for producing a dispenser container according to claim 1, characterized in that stretch blow molding is carried out in step e) until an outer surface of the inner container body is in contact with an inner surface of the outer container over at least 90% of an expansion of the outer container bottom.

3. The method for producing a dispenser container according to claim 1, characterized in that stretch blow molding in step e) takes place until an outer surface of the inner container body is in contact with an inner surface of the outer container over at least 90% of an expansion of the outer container body.

4. The method for producing a dispenser container according to claim 1, characterized in that the outer container prepared in step a) has the outer container bottom, the outer container body, the outer container nipple and an outer container shoulder, wherein stretch blow molding in step e) takes place until an outer surface of the inner container body is in contact with an inner surface of the outer container over at least 90% of an expansion of the outer container shoulder.

5. A dispenser container having an outer container and an inner container arranged inside of the outer container for holding a filler material, wherein the outer container has an outer container bottom, an outer container body and an outer container nipple having an outer container opening, wherein the outer container is comprised of a dimensionally stable material, wherein the inner container has an inner container body arranged in an area of the outer container body and an inner container dispensing portion having a dispensing opening arranged in an area of the outer container nipple, wherein the inner container dispensing portion extends in a direction of a dispenser container longitudinal axis (SBLA) over an entire expansion of the outer container nipple, wherein the inner container body consists of a blow-molded elastic plastic, and the inner container dispensing portion consists of a dimensionally stable plastic, wherein a surface of the inner container dispensing portion facing the outer container nipple has at least one recess for forming a vent duct, wherein the vent duct forms a fluid connection between an environment and a space located between the inner container and the outer container, wherein an outer surface of the inner container body is in contact with an inner surface of the outer container over at least 90% of an expansion of the outer container bottom.

6. The dispenser container according to claim 5, characterized in that the outer surface of the inner container body is in contact with the inner surface of the outer container over at least 99% of the expansion of the outer container bottom.

7. The dispenser container according to claim 5, characterized in that the outer surface of the inner container body is in contact with the inner surface of the outer container over at least 90% of an expansion of the outer container body.

8. The dispenser container according to claim 5, characterized in that the outer container has the outer container bottom, the outer container body, the outer container nipple and an outer container shoulder, wherein the outer surface of the inner container body is in contact with the inner surface of the outer container over at least 90% of an expansion of the outer container shoulder.

9. The dispenser container according to claim 5, characterized in that the inner container dispensing portion has a continuous collar portion in an area adjacent to the dispensing opening, wherein the collar portion abuts flush against an edge area of the outer container nipple facing away from the outer container body, wherein, on its surface abutting flush against the edge area of the outer container nipple facing away from the outer container body, the collar portion has a recess that goes around the dispensing opening to form a vent slot, wherein, on its surface abutting flush against the edge area of the outer container nipple facing away from the outer container body, the collar portion has at least one recess extending away from the dispensing opening to form at least one vent cutout, wherein at least one recess to form at least one vent duct is fluidically connected with the recess to form the vent slot, and the recess to form the vent slot is fluidically connected with the at least one recess to form the at least one vent cutout, wherein the at least one vent duct, the vent slot and the at least one vent cutout form a fluidic connection between the environment and the space located between the inner container and the outer container form a fluidic connection between the environment and the space located between the inner container and the outer container.

10. The dispenser container according to claim 9, characterized in that the recess to form the vent slot provided in the collar portion and running around the dispensing opening runs concentrically to the dispensing opening.

11. The dispenser container according to claim 9, characterized in that the inner container dispensing portion has several recesses on its surface facing the outer container nipple to form several vent ducts, wherein the recesses to form the vent ducts run parallel to each other.

12. The dispenser container according to claim 11, characterized in that the recesses to form the vent ducts are provided evenly distributed over a circumference of the inner container dispensing portion.

13. The dispenser container according to claim 9, characterized in that the collar portion has several recesses to form several vent cutouts extending away from the dispensing opening, wherein the recesses to form the vent cutouts are provided evenly distributed over a circumference of the inner container dispensing portion.

14. The dispenser container according to claim 5, characterized in that the dimensionally stable material of the outer container consists of glass, plastic, metal, a metal alloy or a composite material.

15. The dispenser container according to claim 5, characterized in that the blow molded elastic plastic of the inner container body is a thermoplastic material.

16. The dispenser container according to claim 5, characterized in that the dimensionally stable plastic of the inner container dispensing portion has a higher melting temperature than the blow-molded elastic plastic of the inner container body.

17. The dispenser container manufactured using the method according to claim 1.

18. The dispenser container manufactured using the method according to claim 2.

19. The dispenser container manufactured using the method according to claim 3.

20. The dispenser container manufactured using the method according to claim 4.

* * * * *